United States Patent
Billimoria et al.

(10) Patent No.: US 10,889,204 B2
(45) Date of Patent: Jan. 12, 2021

(54) VEHICLE THERMAL MANAGEMENT FLOW CONTROL ASSEMBLY AND FLOW CONTROL METHOD

(71) Applicant: Ford Global Technologies, LLC, Dearborn, MI (US)

(72) Inventors: Erik Billimoria, Canton, MI (US); Stephen Pien, Farmington Hills, MI (US); Andrew Charles Samyn, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/193,174

(22) Filed: Nov. 16, 2018

(65) Prior Publication Data
US 2020/0156502 A1    May 21, 2020

(51) Int. Cl.
*B60L 58/26* (2019.01)
*B60K 1/00* (2006.01)
*B60K 1/04* (2019.01)
*B60K 11/06* (2006.01)
*B60K 11/08* (2006.01)

(52) U.S. Cl.
CPC ............... *B60L 58/26* (2019.02); *B60K 1/00* (2013.01); *B60K 1/04* (2013.01); *B60K 11/06* (2013.01); *B60K 11/085* (2013.01); *B60K 2001/005* (2013.01); *B60K 2001/0438* (2013.01)

(58) Field of Classification Search
CPC . B60L 58/26; B60K 11/085; B60K 2001/005; B60K 2001/0438; B60K 2001/0416; B62D 35/008
See application file for complete search history.

(56) References Cited

U.S. PATENT DOCUMENTS 6,660,967 B2    12/2003  Brofft et al.
10,377,431 B2 *  8/2019  Kishima .............. B62D 33/023
10,468,645 B2 * 11/2019  Jackson ................... B60K 1/04
(Continued)

FOREIGN PATENT DOCUMENTS

CN    204927377    12/2015
JP    2011079405    4/2011

OTHER PUBLICATIONS

U.S. Appl. No. 16/124,298, filed Sep. 7, 2018.

*Primary Examiner* — Brian L Swenson
(74) *Attorney, Agent, or Firm* — David Kelley, Esq.; Carlson, Gaskey & Olds, P.C.

(57) ABSTRACT

An exemplary vehicle assembly includes, among other things, an inlet duct that opens to a duct opening within a side of a cargo bed. The inlet duct is configured to communicate a flow of air to a heat exchange module that manages thermal energy levels of a traction battery. A flow control structure is moved relative to the duct opening to selectively restrict or permit the flow of air entering the inlet duct through the duct opening. A flow control method includes, among other things, selectively blocking at least a portion of a duct opening to adjust a flow of air moved through the duct opening into an inlet duct. To manage thermal energy within a traction battery, the method further includes exchanging thermal energy between the air and another fluid at a heat exchange module that is disposed within a chamber of a cargo bed.

19 Claims, 5 Drawing Sheets

(56) References Cited

U.S. PATENT DOCUMENTS

| | | | |
|---|---|---|---|
| 2005/0056472 A1* | 3/2005 | Smith | B60H 1/00278 180/68.1 |
| 2010/0243352 A1* | 9/2010 | Watanabe | B60K 11/085 180/68.1 |
| 2010/0276220 A1* | 11/2010 | Kubota | B60L 58/26 180/68.1 |
| 2011/0005851 A1 | 1/2011 | Doroghazi et al. | |
| 2015/0283889 A1* | 10/2015 | Agnew | B60K 1/00 180/292 |
| 2017/0054188 A1* | 2/2017 | Blatchley | H01M 10/663 |
| 2017/0361879 A1* | 12/2017 | Frayer | B62D 35/00 |
| 2018/0170456 A1* | 6/2018 | Schroeck | B62D 33/023 |
| 2018/0354355 A1* | 12/2018 | Temple | B60K 11/085 |
| 2019/0383204 A1* | 12/2019 | Wolf | B60K 11/085 |

\* cited by examiner

VEHICLE THERMAL MANAGEMENT FLOW CONTROL ASSEMBLY AND FLOW CONTROL METHOD

TECHNICAL FIELD

This disclosure relates generally to an assembly that manages thermal energy levels of a traction battery and, more particularly, to controlling a flow of air to such an assembly.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. The traction battery can include battery arrays each including a plurality of interconnected battery cells that store energy. Traction batteries of electrified vehicles typically include a plurality of arrays each having individual battery cells that are periodically recharged to replenish the energy necessary to power the electric machines. Battery cells can heat up during charging and discharging, and during other stages of operation. Operating the battery cells at certain temperatures can improve the capacity and the life of the battery cells. Managing thermal energy levels of the traction battery can facilitate efficient operation.

SUMMARY

A vehicle assembly according to an exemplary aspect of the present disclosure includes, among other things, an inlet duct that opens to a duct opening within a side of a cargo bed. The inlet duct is configured to communicate a flow of air to a heat exchange module that manages thermal energy levels of a traction battery. A flow control structure is moved relative to the duct opening to selectively restrict or permit the flow of air entering the inlet duct through the duct opening.

In a further non-limiting embodiment of the foregoing assembly, the flow control structure comprises at least one louver moveable back and forth between a first position that permits more flow through the duct opening into the inlet duct and a second position that permits less flow through the duct opening into the inlet duct.

In a further non-limiting embodiment of any of the foregoing assemblies, the side is a horizontally facing side.

In a further non-limiting embodiment of any of the foregoing assemblies, the duct opening is disposed forward a wheel well of a vehicle having the cargo bed and aft of a passenger cabin of the vehicle.

In a further non-limiting embodiment of any of the foregoing assemblies, the flow control structure is the side of the cargo bed.

In a further non-limiting embodiment of any of the foregoing assemblies, the inlet duct is moveable back and forth between an extended position and a retracted position relative to the side. When the inlet duct is in the extended position, the duct opening projects from the side to permit a first amount of the flow to enter the inlet duct through the duct opening. When the inlet duct is in the retracted position, the duct opening is at least partially retracted behind the side to permit a second amount of the flow to enter the inlet duct. The second amount is less than the first amount.

In a further non-limiting embodiment of any of the foregoing assemblies, when the inlet duct is in the retracted position, the inlet duct opening is fully retracted behind the side such that the second amount of the flow is nominally no flow.

In a further non-limiting embodiment of any of the foregoing assemblies, the flow control structure comprises at least one flap that is moveable between a first position that permits a first amount of the flow through the duct opening and a second position that permits a second amount of flow through the duct opening. The second amount is less than the first amount.

In a further non-limiting embodiment of any of the foregoing assemblies, the at least one flap in the first position projects outward from the side, and the at least one flap in the second position is substantially flush with the side.

In a further non-limiting embodiment of any of the foregoing assemblies, the duct opening comprises a plurality of individual duct openings spaced from each other along a longitudinal axis of the cargo bed. The flow control structure comprises at least one flap associated with each of the individual duct openings. The flaps are each moveable between a first position that permits a first amount of the flow through the duct opening and a second position that permits a second amount of flow through the duct opening. The second amount is less than the first amount.

In a further non-limiting embodiment of any of the foregoing assemblies, the inlet duct is a driver side inlet duct, the side is a driver side of a vehicle having the cargo bed, and the assembly further includes a passenger side inlet duct that that selectively conveys a flow of air to a heat exchange module that manages thermal energy levels of a traction battery.

In a further non-limiting embodiment of any of the foregoing assemblies, the heat exchange module is disposed within a chamber between inner and outer panels of the cargo bed.

A further non-limiting embodiment of any of the foregoing assemblies includes a fan that communicates a flow of air through the heat exchange module. The fan s disposed within the chamber.

In a further non-limiting embodiment of any of the foregoing assemblies, the chamber is a first chamber on a driver side of the vehicle and the heat exchange module is a first heat exchange module. The vehicle further includes a second heat exchange module disposed within a second chamber between inner and outer panels of the cargo bed on a passenger side of the vehicle.

A flow control method according to another exemplary non-limiting embodiment of the foregoing disclosure includes, among other things, selectively blocking at least a portion of a duct opening to adjust a flow of air moved through the duct opening into an inlet duct. To manage thermal energy within a traction battery, the method further includes exchanging thermal energy between the air and another fluid at a heat exchange module that is disposed within a chamber of a cargo bed.

In a further non-limiting embodiment of the foregoing method, the chamber is between inner and outer panels of the cargo bed.

In a further non-limiting embodiment of any of the foregoing methods, the chamber is forward of a wheel well and aft of a passenger cabin.

A further non-limiting embodiment of any of the foregoing methods includes extending the duct opening away from a side of the cargo bed to permit a first amount of air to flow through the inlet duct, and retracting the duct opening at least partially behind the side to permit a second amount of air to flow the inlet duct. The first amount is more than the second amount.

A further non-limiting embodiment of any of the foregoing methods includes moving at least one flap between a first position that permits a first amount of the flow through the inlet duct and a second position that permits a second amount of flow through the inlet duct. The second amount is less than the first amount.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a thermal management assembly for an electrified vehicle. The thermal management assembly includes a heat exchange module packaged between inner and outer panels of a cargo bed. Various techniques can be utilized to selectively control flow to the heat exchange module. These and other features of this disclosure are described in greater detail in the following paragraphs of this detailed description.

Figure 1:
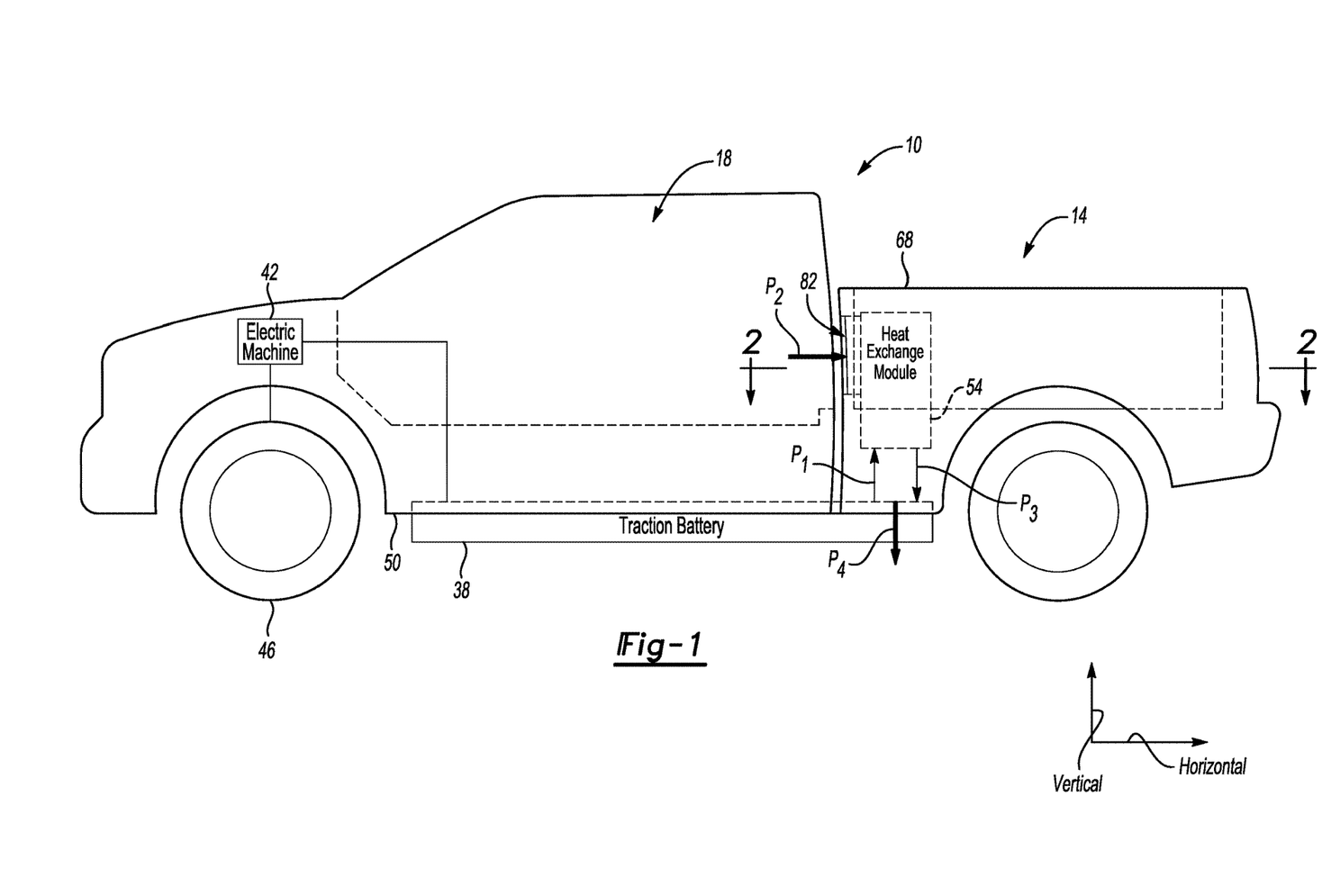
FIG. 1 illustrates a schematic side view of an electrified vehicle equipped with a cargo bed for storing and hauling cargo.

FIG. 1 schematically illustrates a vehicle 10 including a cargo bed 14. In the illustrated embodiment, the vehicle 10 is a pickup truck. While a truck is pictured, vehicles other than trucks could also benefit from the teachings of this disclosure.

The cargo bed 14 establishes a cargo space for storing and hauling cargo with the vehicle 10. The example cargo bed 14 is rearward of a passenger cabin 18 of the vehicle 10.

Figure 2:
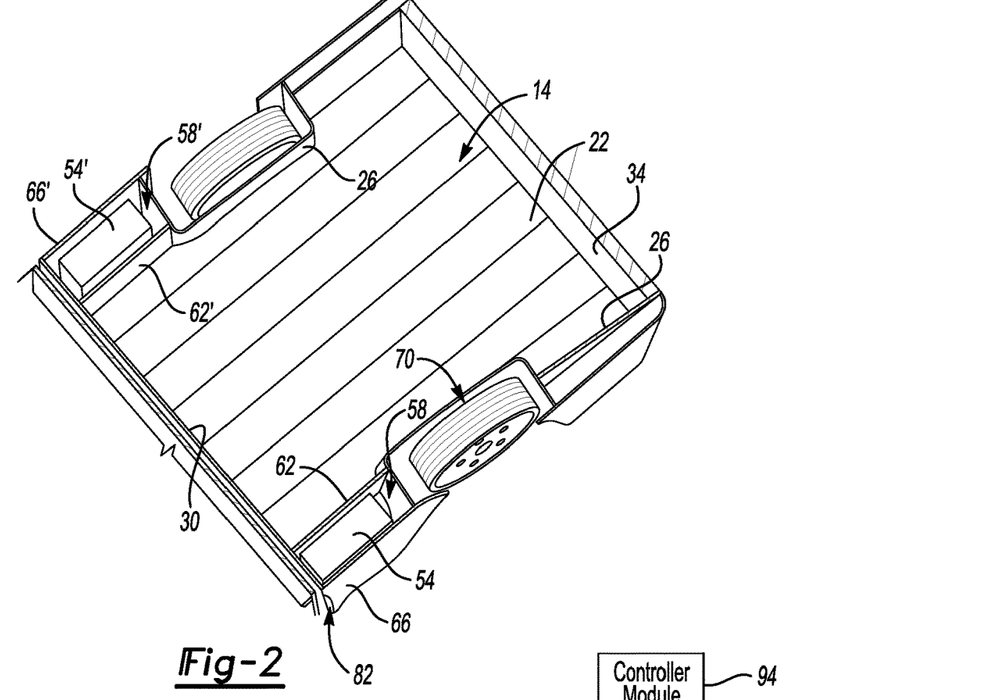
FIG. 2 illustrates a section taken at line 2-2 in FIG. 1.

With reference now to FIG. 2 and continued reference to FIG. 1, the cargo bed 14 includes a floor 22 extending between a pair of longitudinally extending sidewalls 26. A front of the cargo bed 14 is provided by a front wall 30 that is aft the passenger cabin 18. A rear of the cargo bed 14 is provided by a tailgate 34.

The vehicle 10 further includes a traction battery 38, at least one electric machine 42, and a plurality of drive wheels 46. When powered, the electric machine 42 can drive the drive wheels 46 to move the vehicle 10. The electric machine 42 can receive electric power from the traction battery 38. The electric machine 42 converts the electric power to torque to drive the drive wheels 46. The example traction battery 38 is considered a relatively high-voltage battery.

The example vehicle 10 is an all-electric vehicle. In other examples, the vehicle 10 is a hybrid electric vehicle, which selectively drives wheels using torque provided by an internal combustion engine instead of, or in addition to, the electric machine. Generally, the vehicle 10 can be any type of vehicle having a traction battery.

The vehicle 10 includes an underbody structure 50, which faces vertically downward. The traction battery 38 is mounted to the underbody structure 50 in a position vertically below the passenger cabin 18 and, in this example, vertically below the cargo bed 14. The vehicle 10 also includes horizontally facing sides and a downwardly facing side. Vertical and horizontal, for purposes of this disclosure, refer to the general orientation of the vehicle 10 with respect to ground during ordinary operation of the vehicle 10.

The vehicle 10 includes a thermal management assembly that is used to, among other things, manage thermal energy levels of the traction battery 38. Managing thermal energy levels can facilitate efficient operation of the traction battery 38. One component of the thermal management assembly is a heat exchange module 54.

For purposes of this disclosure, the heat exchange module 54 is described as being used to manage thermal energy levels of the traction battery 38 of the all-electric vehicle. The vehicle including the traction battery 38 could instead be a hybrid electric vehicle (HEV), a plug-in hybrid electric vehicles (PHEV), or another type of electric vehicle. The heat exchange module 54 could be used to manage thermal energy levels of components other than a traction battery, such as for rear axle cooling. The heat exchange module 54, in such examples, could be used in conventional vehicles that do not include a traction battery.

Figure 3:
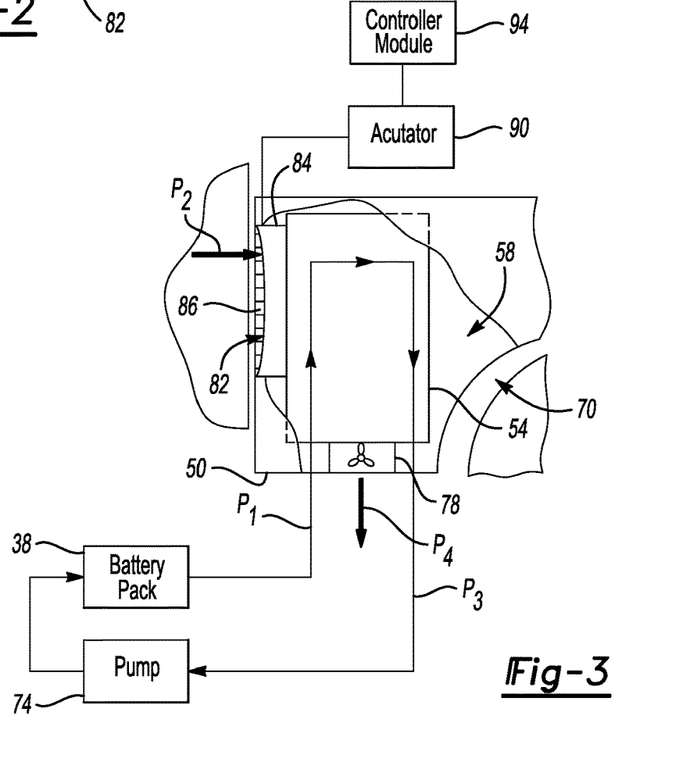
FIG. 3 illustrates a close-up view of an area of the vehicle of FIG. 1 with selected portions cut away to show a heat exchange module disposed between inner and outer panels of the cargo bed.

Referring now to FIG. 3, with continued reference to FIGS. 1 and 2, a first fluid moves from the traction battery 38 to the heat exchange module 54 along a path $P_1$. The first fluid moved along the path $P_1$ can be a liquid coolant that, prior to moving along the path $P_1$ is circulated through the traction battery 38 where the first fluid is heated with thermal energy from the traction battery 38. In this example, the first fluid is water. A second fluid, here, a flow of air, moves to the heat exchange module 54 along a path $P_2$.

Within the heat exchange module 54, thermal energy is exchanged between the first fluid and the second fluid. The heat exchange module 54 refers to module of the thermal management assembly where thermal energy is exchanged between the first fluid and the second fluid. The exchange could include thermal energy passing from the first fluid to the second fluid, which cools the first fluid. The exchange could include thermal energy passing from the second fluid to the first fluid, which cools the second fluid.

In this example, the first fluid is cooled by the second fluid within the heat exchange module 54. The heat exchange module 54 could include a bundle of tubes for communicating the first fluid through the heat exchange module 54. The second fluid, which is the flow of air in this example, is passed over the bundle of tubes. Within the heat exchange module 54, thermal energy from the first fluid communicating through the bundle of tubes passes from the first fluid to the second fluid.

The first fluid, which has been cooled at the heat exchange module 54, can then move back to the traction battery 38 along path $P_3$. The second fluid, which has been heated at the heat exchange module 54 by the first fluid, exits the heat exchange module 54 along path $P_4$.

The heat exchange module 54 is held within a chamber 58 that is between an inner panel 62 and an outer panel 66 of the sidewall 26 on a driver's side of the vehicle 10. Inner and outer, for purposes of the panels in this disclosure, is with reference to the cargo bed 14. The inner panels 62 and the outer panel 66 are both exposed and visible, but this is not required. That is, the inner panel 62 does not have to be the innermost panel, nor does the outer panel 66 have to be the outermost panel. The inner panel 62 and outer panel 66 are both sheet metal in this example, but could have other material compositions.

A side rail cover 68 can enclose the heat exchange module 54 within the chamber 58. The side rail cover 68 could be selectively removable so that the heat exchange module 54 can be serviced and maintained. The underbody structure 50 provides a floor of the chamber 58.

The heat exchange module 54 is held within the chamber 58 at a position that is aft of the front wall 30 and forward a wheel well area 70 of the vehicle 10. In another example, the heat exchange module 54 could be aft the wheel well area 70.

The heat exchange module 54 is a first heat exchange module. The thermal management assembly for the vehicle 10 can further include a second heat exchange module 54' packaged within a chamber 58' provided between an inner panel 62' and an outer panel 66' of the sidewall 26 on a passenger side of the vehicle 10.

A pump 74, or pumps, can be used to move the first fluid along the path $P_1$ to the heat exchange module 54 and from the heat exchange module 54 along the path $P_3$. The pump 74 can be packaged outside of the chamber 58 in another area of the vehicle 10.

A fan 78, or fans, can be used to move the second fluid along the path $P_2$ through the heat exchange module 54 and along the path $P_4$ from the heat exchange module 54. The fan 78, in the exemplary embodiment, is disposed within the chamber 58. The fan 78 could be upstream from where thermal energy is exchanged between the first fluid and the second fluid. The fan 78, in such an example, is used to push air through the heat exchange module 54. The fan 78 could be downstream from where thermal energy is exchanged between the first fluid and the second fluid. The fan 78, in such an example, is used to pull air through the heat exchange module 54. The fan 78 could also include a combination of an upstream fan and a downstream fan.

The second fluid moves along the path $P_2$ through a duct opening 82 into an inlet duct 84, which then communicates the second fluid to the heat exchange module 54. The duct opening 82 provides an opening for the second fluid to move into the inlet duct 84.

The duct opening 82 is within a side of the cargo bed 14. In this example, the duct opening 82 is within the outer panel 66 and the inlet duct 84 thus opens to a horizontally facing side of the vehicle 10. The example duct opening 82 also faces at least partially forward relative to the orientation of the vehicle 10. Accordingly, as the vehicle 10 is driven forward, air is directed through the duct opening 82 into the inlet duct 84.

In another example, the duct opening 82 could instead, or additionally, open vertically upwards such that the second fluid moves vertically downward to the heat exchange module 54. The duct opening 82 that opens vertically upward could be provided within the side rail cover 68.

In yet another example, the duct opening 82 could open into the cargo bed 14 such that the second fluid is moved to the heat exchange module 54 from the cargo bed 14. The duct opening 82 that opens into the cargo bed 14 could be provided within the inner panel 62.

In the exemplary embodiment, a plurality of louvers 86 provide a flow control structure used to control the flow of the second fluid through the duct opening 82. The plurality of louvers 86 are moveable between the position of FIG. 4, which permits flow through the opening along the path $P_2$ to the heat exchange module 54, and the position of FIG. 5 where the louvers 86 block flow through the inlet 82.

An actuator 90 and controller module 94 can be incorporated within the vehicle 10 to move the louvers 86. The controller module 94 can command the actuator 90 to move the louvers 86 from the position of FIG. 4 to the position of FIG. 5, or vice versa.

The controller module 94 can be a microcontroller unit (MCU). The controller module 94 could include a single controller module, or selected portions of a plurality of different controller modules. The controller module 94 could be, or could include, an engine control unit (ECU) of the vehicle 10.

The controller module 94 can include, among other things, a processor and a memory portion. The processor can be programmed to execute a program stored in the memory portion. The processor can be a custom made or commercially available processor, a central processing unit (CPU), an auxiliary processor among several processors associated with the controller module 94, a semiconductor based microprocessor (in the form of a microchip or chipset) or generally any device for executing software instructions.

The memory portion can include any one or combination of volatile memory elements. Programs can be stored in the memory portion as software code and used to selectively open and control the louvers 86 as required. The programs can include one or more additional or separate programs, each of which includes an ordered list of executable instructions for implementing logical functions associated with commanding the actuator 90 to move the louvers 86.

In an exemplary non-limiting embodiment, the controller module 94 assesses that cooling the traction battery 38 is desired. The assessment can be based, for example, on a temperature reading from a temperature sensor associated with the traction battery 38. The traction battery 38 can heat up and require cooling when the vehicle 10 is towing a load, for example.

Figure 4:
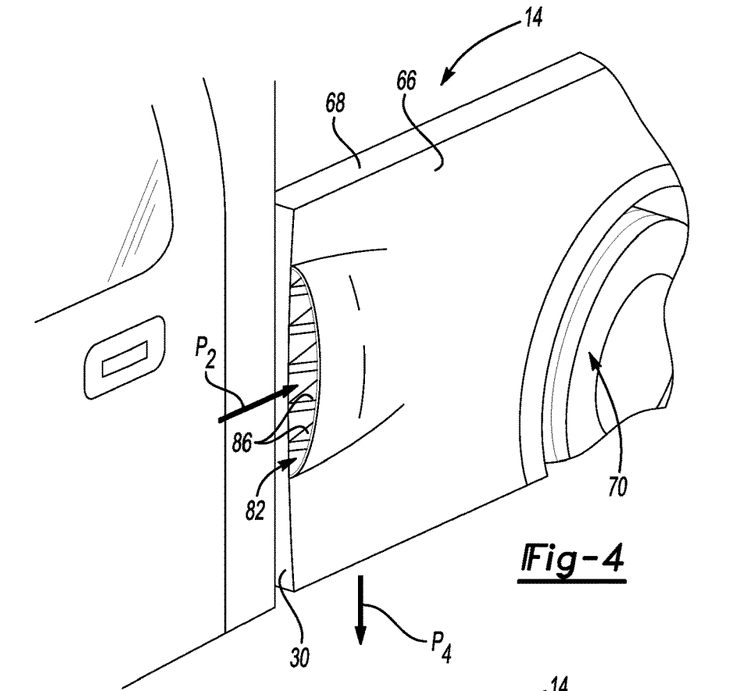
FIG. 4 illustrates a perspective view of the area shown in FIG. 3 with an inlet to the heat exchange module having louvers in a first position that permits more flow through the inlet.

To begin cooling the traction battery 38, the controller module 94 commands the actuator 90 to move the louvers 86 to the position of FIG. 4. In the position of FIG. 4, the louvers 86 permit the flow of the second fluid along the path P₂ into the heat exchange module 54. The flow of the second fluid can take on thermal energy from the first fluid to cool the traction battery.

Figure 5:
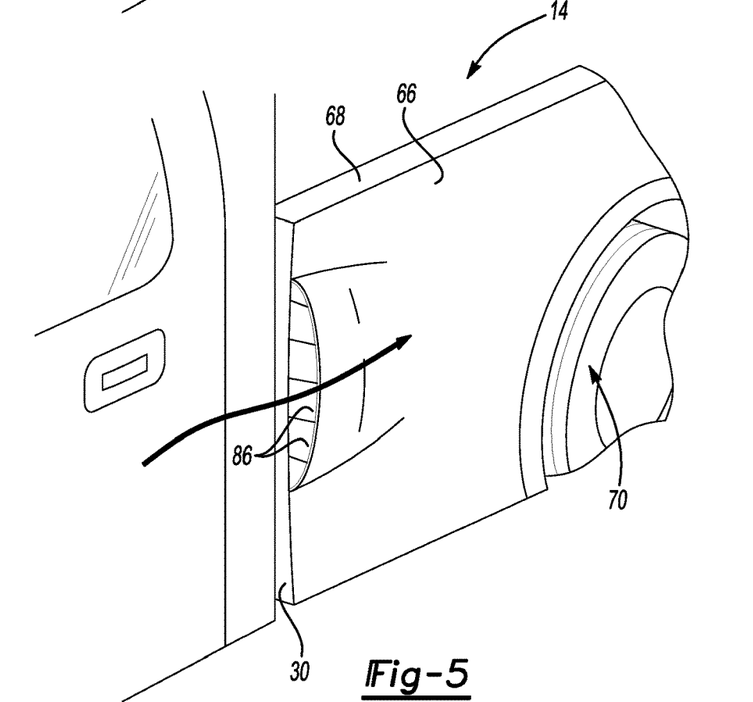
FIG. 5 illustrates the view of FIG. 4 but with the louvers in a second position that permits less flow through the inlet.

If cooling the traction battery 38 utilizing the heat exchange module 54 is not desired, the controller module 94 can command the actuator 90 to move the louvers 86 to the position of FIG. 5.

In this exemplary embodiment, an outlet 98 from the heat exchange module 54 opens to the downwardly facing underbody structure 50 of the vehicle. This ensures that the second fluid, which may be heated after passing through the heat exchange module 54, is not directed into the cargo bed 14.

Figure 6:
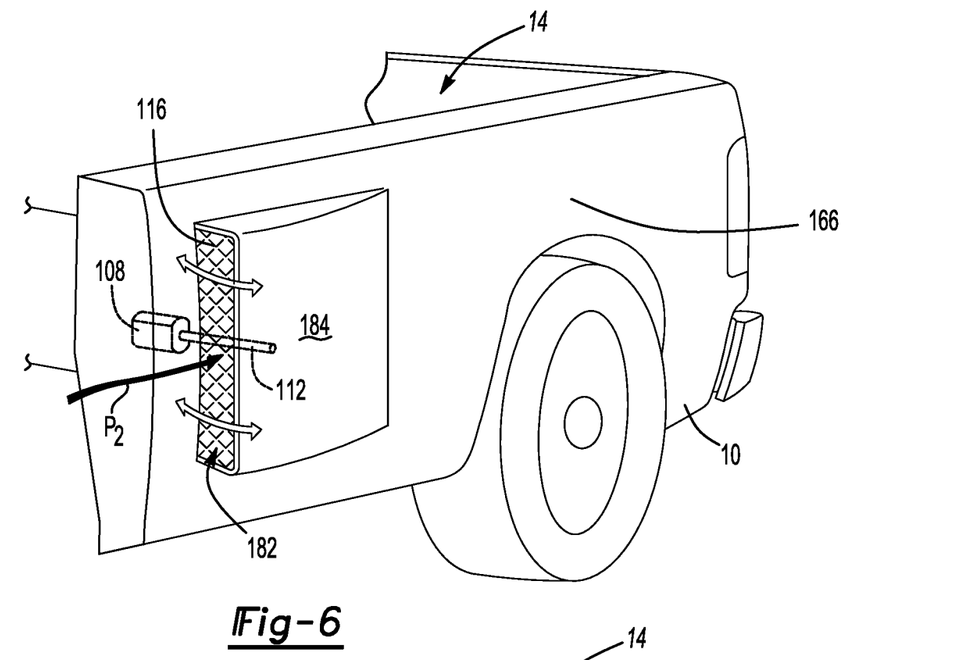
FIG. 6 illustrates a perspective view of the area shown in FIG. 3 according to another exemplary embodiment where an inlet duct is in an extended position.
Figure 7:
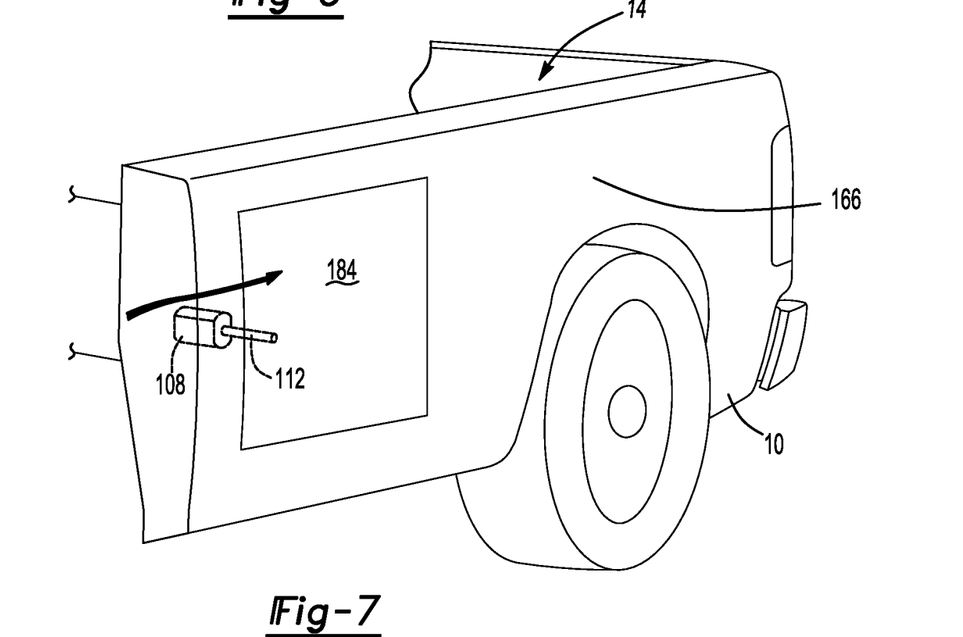
FIG. 7 illustrates the view of FIG. 6 but with the inlet duct in a retracted position.

With reference now to FIGS. 6 and 7, in another exemplary non-limiting embodiment, an inlet duct 184 communicates a flow of air to the heat exchange module. The inlet duct 184 opens to an inlet duct opening 182. Like the embodiment of FIGS. 1-5, the heat exchange module can be held within a chamber that is between an inner panel and an outer panel 166 of the sidewall on a driver side of the vehicle.

The inlet duct 184 is an active duct that can move back and forth between the extended position of FIG. 6 and the retracted position of FIG. 7. In the exemplary non-limiting embodiment, an actuator 108 can extend a rod 112 to move the inlet duct 184 to the fully extended position of FIG. 6. The actuator 108 can retract the rod 112 to move the inlet duct 184 to the fully retracted position of FIG. 7. The actuator 108 can extend or retract the rod 112 different amounts to move the inlet duct 184 to positions between fully extended position and the fully retracted position.

When in the extended position, the duct opening 182 is at least partially revealed and projects at least partially past the side of the vehicle 10. Air can enter the inlet duct 184 through the portion of the duct opening 182 projecting past the side of the vehicle 10. A screen 116 could be used to cover the duct opening 182. The screen 116 can prevent undesired items, such as rocks or debris, from entering the inlet duct 184 through the duct opening 182.

The inlet duct 184 can be moved by the actuator 108 to positions between the fully open position of FIG. 6 and the fully closed position of FIG. 7 to control an amount of the duct opening 182 project outward past the side. When the duct opening 182 projects outward past the side, more the flow of the second fluid along the path P₂ can move through the duct opening 182 into the inlet duct 184 to the heat exchange module 54. Projecting more of the duct opening 182 past the side enables more flow to move through the duct opening 182.

When less of the duct opening 182 projects outward past the side of the vehicle 10, less air can enter the inlet duct 184. Extending and retracting the inlet duct 184 can thereby control an amount of flow entering the inlet duct 184 through the duct opening 182. The side of the cargo bed 14, here the outer panel 166, acts as a flow control structure. The inlet duct 184 is moved relative to the side to selectively restrict or permit flow through the duct opening 182.

In the exemplary non limiting embodiment, no portion of the duct opening 182 projects outward from the side of the vehicle 10 when the inlet duct 184 is in the fully retracted position. Thus, when the inlet duct 184 is in the fully retracted position substantially no flow moves through the duct opening 182 into the inlet duct 184. Also, when the inlet duct 184 is in the fully retracted position, the inlet duct 184 is substantially flush with the surrounding portions of the outer panel 166. This can help to visually hide the inlet duct 184 from view when cooling the heat exchange module with the flow is not required.

The movement of the inlet duct 184 to positions that permit more flow through the duct opening 182 can be based on cooling needs for the heat exchange module cooled by the flow. Another inlet duct could be positioned on the passenger side of the vehicle 10 to similarly control flow to a heat exchange module within a passenger side chamber of the cargo bed 14.

Figure 8:
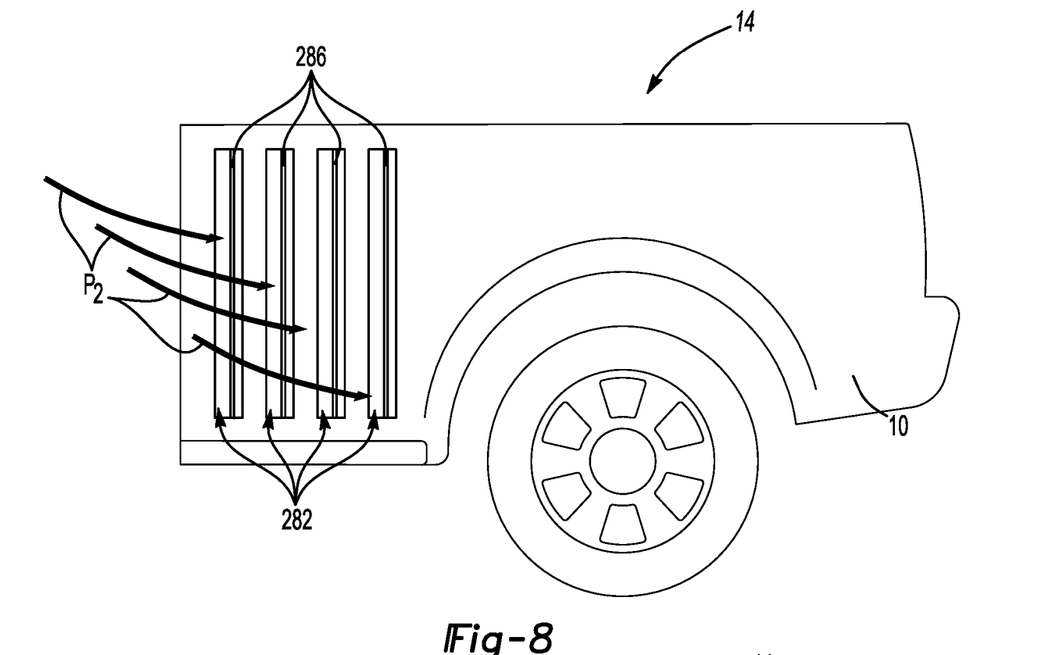
FIG. 8 illustrates a side view of the area shown in FIG. 3 with a plurality of inlet duct openings with associated flaps in a first position.
Figure 9:
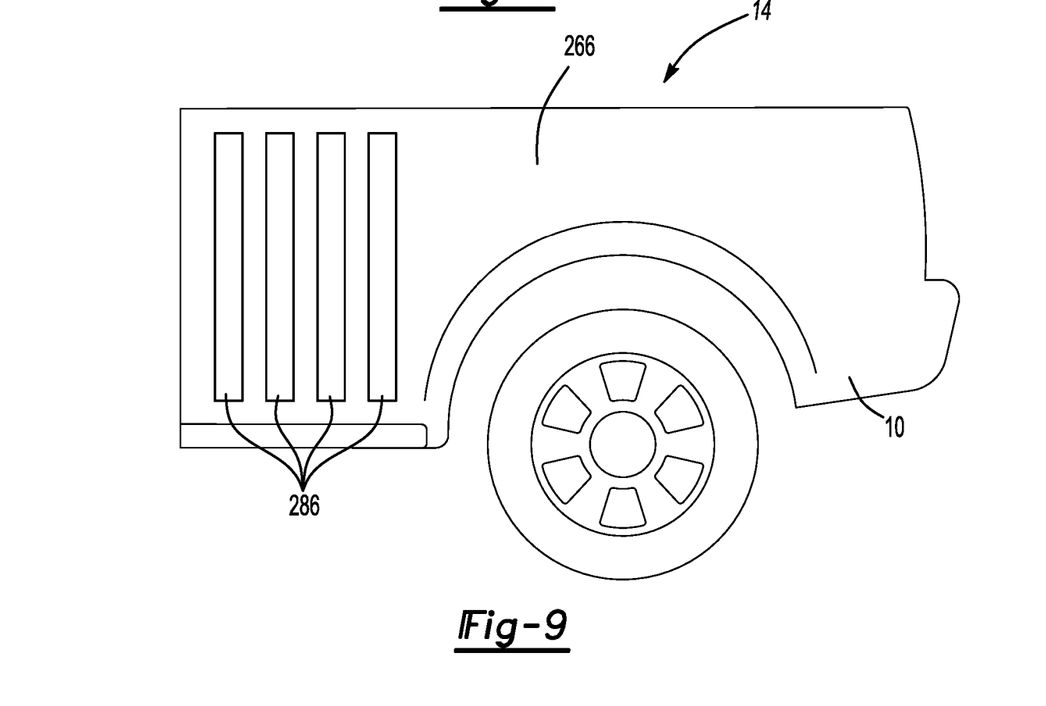
FIG. 9 illustrates the area of FIG. 9 with the flaps in a second position that prevents less flow through the inlet duct openings.

With reference now to FIGS. 8 and 9, in another exemplary embodiment, the flow of the second fluid along the path P₂ can move though a plurality of individual duct openings 282 through an inlet duct to a heat exchange module. The inlet duct opens to the plurality of individual duct openings 282. For clarity, the inlet duct and heat exchange module are not shown in FIGS. 8 and 9. The inlet duct and heat exchange module in FIGS. 8 and 9 could be positioned similarly to the embodiments of FIGS. 1-5.

The individual duct openings 282 are spaced from each other along a longitudinal axis A of the cargo bed 14. A flap 286 is associated with each of the openings. The flaps 286 are pivotable back and forth between positions (FIG. 8) that permit more air to pass through the duct openings 282 and positions (FIG. 9) that permit less air to pass through the duct openings 282. The flaps 286 provide a flow control structure that controls flow into an inlet duct.

In position of FIG. 8, the flaps 286 project outward from the side of the vehicle 10, here the outer panel 266. As the vehicle 10 is driven forward, the flaps 286 in the position of FIG. 8 act as scoops that direct air through the openings 282.

In the position of FIG. 9, the flaps 286 are pivoted to a second position where the flaps 286 cover the openings 282 and substantially block all flow through the openings 282. In the position of FIG. 9, the flaps 286 are substantially flush with the outer panel 266.

The openings 282 and flaps 286 in FIGS. 8 and 9 are shown on a driver side of the vehicle 10. The vehicle 10 can additionally include a set of openings and corresponding flaps on a passenger side. The flaps on the passenger side are similarly moveable to control flow through the plurality of openings.

An actuator (not shown) can be used to control the pivoting movement of the flaps 286. In some examples, the flaps 286 are separately pivotable. For example, two of the flaps 286 could be moved to the position of FIG. 9 while the two remaining flaps stay in the position of FIG. 8. Separately controlling the pivoting of the flaps 286 could facilitate controlling an amount of flow moving to the inlet duct. More flaps 286 could be opened if more flow is desired, and less flaps opened if less flow is desired. A person having skill in this art and the benefit of this disclosure could develop and actuator and control system of such control of the flaps 286. The actuator 90 and controller module 94 of FIG. 3 could be used, for example.

Features of the exemplary embodiments can include controlling flow to a heat exchange module of a thermal management system that is packaged, for example, between panels of a cargo bed of a vehicle. Packaging the heat exchange module between the panels of the cargo bed can provide additional front storage space for a vehicle. Further, the heat exchange module packaged between the panels is substantially hidden from view, which reduces the visual impact of the heat exchange module.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A flow control assembly, comprising:
an inlet duct that opens to a duct opening within a side of a cargo bed, the inlet duct configured to communicate a flow of air to a heat exchange module that manages thermal energy levels of a traction battery; and
a flow control structure that is moved relative to the duct opening to selectively restrict or permit the flow of air entering the inlet duct through the duct opening.

2. The flow control assembly of claim 1, wherein the flow control structure comprises at least one louver moveable back and forth between a first position that permits more flow through the duct opening into the inlet duct and a second position that permits less flow through the duct opening into the inlet duct.

3. The flow control assembly of claim 1, wherein the side is a horizontally facing side, wherein the cargo bed is a cargo bed of a pickup truck and is outside a passenger cabin of the pickup truck.

4. The flow control assembly of claim 1, wherein the duct opening is disposed forward a wheel well of a pickup truck having the cargo bed and aft of a passenger cabin of the pickup truck.

5. The flow control assembly of claim 1, wherein the flow control structure is the side of the cargo bed.

6. The flow control assembly of claim 5, wherein the inlet duct is moveable back and forth between an extended position and a retracted position relative to the side,
when the inlet duct is in the extended position, the duct opening projects from the side to permit a first amount of the flow to enter the inlet duct through the duct opening,
when the inlet duct is in the retracted position, the duct opening is at least partially retracted behind the side to permit a second amount of the flow to enter the inlet duct, the second amount less than the first amount.

7. The flow control assembly of claim 6, wherein, when the inlet duct is in the retracted position, the inlet duct opening is fully retracted behind the side such that the second amount of the flow is nominally no flow.

8. The flow control assembly of claim 1, wherein the flow control structure comprises at least one flap that is moveable between a first position that permits a first amount of the flow through the duct opening and a second position that permits a second amount of flow through the duct opening, the second amount less than the first amount.

9. The flow control assembly of claim 8, wherein the at least one flap in the first position projects outward from the side, and the at least one flap in the second position is substantially flush with the side.

10. The flow control assembly of claim 1, wherein the duct opening comprises a plurality of individual duct openings spaced from each other along a longitudinal axis of the cargo bed, wherein the flow control structure comprises at least one flap associated with each of the individual duct openings, the at least one flaps each moveable between a first position that permits a first amount of the flow through the duct opening and a second position that permits a second amount of flow through the duct opening, the second amount less than the first amount.

11. The flow control assembly of claim 1, wherein the inlet duct is a driver side inlet duct, the side is a driver side of a vehicle having the cargo bed, and further comprising a passenger side inlet duct that that selectively conveys a flow of air to a heat exchange module that manages thermal energy levels of a traction battery.

12. The flow control assembly of claim 1, further comprising the heat exchange module disposed within a chamber between inner and outer panels of the cargo bed.

13. The flow control assembly of claim 12, further comprising a fan that communicates a flow of air through the heat exchange module, the fan disposed within the chamber.

14. The flow control assembly of claim 12, wherein the chamber is a first chamber on a driver side of the vehicle and the heat exchange module is a first heat exchange module, the vehicle further including a second heat exchange module disposed within a second chamber between inner and outer panels of the cargo bed on a passenger side of the vehicle.

15. A flow control method, comprising:
selectively blocking at least a portion of a duct opening to adjust a flow of air moved through the duct opening into an inlet duct; and
to manage thermal energy within a traction battery, exchanging thermal energy between the air and another fluid at a heat exchange module that is disposed within a chamber of a cargo bed, wherein the chamber is forward of a wheel well and both aft and outside of a passenger cabin.

16. The flow control method of claim 15, wherein the chamber is between inner and outer panels of the cargo bed.

17. The flow control method of claim 15, further comprising extending the duct opening away from a side of the cargo bed to permit a first amount of air to flow through the inlet duct, and retracting the duct opening at least partially behind the side to permit a second amount of air to flow the inlet duct, the first amount more than the second amount.

18. The flow control method of claim 15, further comprising moving at least one flap between a first position that permits a first amount of the flow through the inlet duct and a second position that permits a second amount of flow through the inlet duct, the second amount less than the first amount.

19. A flow control assembly, comprising:
a cargo bed of a pickup truck, the cargo bed entirely aft a passenger cabin of the pickup truck;
a heat exchange module that manages thermal energy levels of a traction battery, the heat exchange module disposed within a chamber of a sidewall of the cargo bed, the chamber between an inner panel and an outer panel of the sidewall;
an inlet duct that opens to a duct opening within a horizontally facing side of a cargo bed, the duct opening disposed forward a wheel well of pickup truck and aft of the passenger cabin of the pickup truck, the inlet duct configured to communicate a flow of air to the heat exchange module; and
a flow control structure that is moved relative to the duct opening to selectively restrict or permit the flow of air entering the inlet duct through the duct opening.

* * * * *

UNITED STATES PATENT AND TRADEMARK OFFICE
CERTIFICATE OF CORRECTION

PATENT NO. : 10,889,204 B2
APPLICATION NO. : 16/193174
DATED : January 12, 2021
INVENTOR(S) : Billimoria et al.

It is certified that error appears in the above-identified patent and that said Letters Patent is hereby corrected as shown below:

In the Claims

In Claim 11, Column 10, Line 4; replace "that that" with --that--

In Claim 17, Column 10, Line 37; replace "to flow the" with --to flow through the--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*